US012799812B2

(12) United States Patent
Lei et al.

(10) Patent No.: US 12,799,812 B2
(45) Date of Patent: Nov. 17, 2026

(54) BLIND DRIVING DEVICE

(71) Applicant: LEAFY WINDOWARE CO., LTD., Dongguan City (CN)

(72) Inventors: Zhenbang Lei, Dongguan City (CN); Xingbang Lei, Dongguan City (CN)

(73) Assignee: LEAFY WINDOWARE CO., LTD., Dongguan City (CN)

( * ) Notice: Subject to any disclaimer, the term of this patent is extended or adjusted under 35 U.S.C. 154(b) by 177 days.

(21) Appl. No.: 18/729,085

(22) PCT Filed: Sep. 21, 2022

(86) PCT No.: PCT/CN2022/120243
§ 371 (c)(1),
(2) Date: Jul. 15, 2024

(87) PCT Pub. No.: WO2024/060071
PCT Pub. Date: Mar. 28, 2024

(65) Prior Publication Data

US 2025/0084694 A1 Mar. 13, 2025

(51) Int. Cl.
*E06B 9/322* (2006.01)
*E06B 9/262* (2006.01)

(52) U.S. Cl.
CPC .............. *E06B 9/322* (2013.01); *E06B 9/262* (2013.01); *E06B 2009/3225* (2013.01)

(58) Field of Classification Search
CPC .. E06B 9/262; E06B 2009/2627; E06B 9/322; E06B 2009/3225; E06B 9/32
See application file for complete search history.

(56) References Cited

U.S. PATENT DOCUMENTS

| | | | | |
|---|---|---|---|---|
| 9,732,555 B2 * | 8/2017 | Morris | E06B 9/262 |
| 9,765,565 B2 * | 9/2017 | Morris | E06B 9/262 |
| 2008/0053626 A1 * | 3/2008 | Jarosinski | E06B 9/322 160/168.1 P |
| 2012/0267060 A1 * | 10/2012 | Anderson | E06B 9/262 160/307 |
| 2015/0028144 A1 * | 1/2015 | Defenbaugh | E06B 9/322 242/378.4 |

(Continued)

FOREIGN PATENT DOCUMENTS

| | | |
|---|---|---|
| CN | 202031462 U | 11/2011 |
| CN | 208486805 U * | 2/2019 |

(Continued)

*Primary Examiner* — Daniel P Cahn
*Assistant Examiner* — Jeremy C Ramsey

(57) ABSTRACT

A blind driving device includes two cord winding and unwinding mechanisms each including bases, reels rotatably mounted to the bases, cords, and a power component. Each reel is a conical cylinder whose diameter gradually decreases from one end to the other end. Each base forms a first cord guide on a position corresponding to a great diameter end of the reel. One end of the cord is fixed to a small diameter end of the reel, while the other end of the cord is led out from the great diameter end after being wound along the reel and extends to be connected to a blind body after extending about the first cord guide. The reels of the two mechanisms are arranged in parallel in an axial direction, with the great diameter ends facing opposite to each other, or are arranged in parallel in the axial direction and are misaligned.

14 Claims, 4 Drawing Sheets

(56) References Cited

U.S. PATENT DOCUMENTS

2025/0020022 A1* 1/2025 Jiang ........................ E06B 9/322

FOREIGN PATENT DOCUMENTS

| | | | |
|---|---|---|---|
| CN | 208564408 | U | 3/2019 |
| CN | 210783894 | U | 6/2020 |
| CN | 114934742 | A | 8/2022 |
| JP | 2006104860 | A | 4/2006 |

* cited by examiner

BLIND DRIVING DEVICE

FIELD OF THE PRESENT INVENTION

The present invention relates to blind accessory technical field and, more particularly to a blind driving device.

BACKGROUND OF THE PRESENT INVENTION

Blind driving devices are used to wind or unwind load-bearing ropes to control blind bodies for shading windows. A current blind driving device includes two rope winding and unwinding mechanisms for connecting different parts of a blind body, to drive the activity of the blind body separately. The rope winding and unwinding mechanism includes a base, a winding drum rotatably mounted to the base, a load-bearing rope wound on the winding drum at one end and extending downwards through the base to connect the blind body at the other end, and a power component for driving the rotation of the winding drum. The load-bearing ropes of the two rope winding and unwinding mechanisms are respectively connected to the different parts of the blind body.

This type of blind driving device has the following defects. The winding drums of the above-mentioned two rope winding and unwinding mechanisms are the same in outer diameters, and are rotatably arranged side by side on the bases of the rope winding and unwinding mechanism. The two winding drums with the same diameter are finally installed in an upper beam through the bases. The mechanism of this rope winding and unwinding mechanism is relatively loose, which makes the thickness of the required upper beam for installing the blind driving device too great, thereby causing that the upper beam using this blind driving device cannot be able to adapt well to specific thicknesses of the blinds. For example, when installing a honeycomb blind with a thickness of 38 mm to 45 mm, it will cause a distance between the honeycomb blind and the wall to be too great, thereby affecting the use experience of the blind.

SUMMARY OF THE INVENTION

Therefore, the technical problem to be solved by the embodiments of the present invention is to provide a blind driving device with a compact structure and a small horizontal size, which can be used for thin upper beams.

To solve the above-mentioned technical problems, an embodiment of the present invention first provides the following solutions. A blind driving device includes two cord winding and unwinding mechanisms connected to different parts of a blind body of a blind to drive the activity of the blind body, each cord winding and unwinding mechanism includes bases, reels respectively rotatably mounted to the bases, cords each with one end being wound on a corresponding reel and the other end extending through a corresponding base and extending down to connect the blind body, and a power component for driving the reels to rotate; the cords of the two cord winding and unwinding mechanisms are connected to the different parts of the blind body; each reel is a conical cylinder whose diameter gradually decreases from one end to the other end, each base forms a first cord guide on a position corresponding to a great diameter end of a corresponding reel; one end of a corresponding cord is fixed to a small diameter end of the reel, while the other end of the cord is led out from the great diameter end of the reel after being wound along the reel, and then extends down to be connected to the blind body after extending about the first cord guide; the reels of the two cord winding and unwinding mechanisms are arranged in parallel in an axial direction, with the great diameter ends facing opposite to each other, or are arranged in parallel in the axial direction and are misaligned.

Furthermore, each cord winding and unwinding mechanism includes at least two axial reels set at a predetermined distance in the axial direction, and at least two bases for rotatably mounting the at least two reels, respectively.

Furthermore, each cord winding and unwinding mechanism further includes a transmission shaft connecting the power component and the corresponding reels, the transmission shaft coaxially extends through centers of the corresponding reels and is relatively fixed to the reels in a circumferential direction.

Furthermore, each base includes a bottom plate and two supporting plates extending from two opposite ends of the bottom plate, the bottom plate defines a cord guiding hole in a position corresponding to a middle or the small diameter end of a corresponding reel, each supporting plate defines a rotation hole, for a corresponding end of the reel to be rotatably engaged in.

Furthermore, a plurality of snapping arms extends up from opposite sides of the bottom plate, to be snapped and positioned by an upper beam of the blind.

Furthermore, the plurality of snapping arms is formed at opposite ends of each side of the bottom plate, lower portions of the supporting plates are integrally connected to lower portions of corresponding snapping arms, while upper portions of the supporting plates are separated from upper portions of the corresponding snapping arms.

Furthermore, the first cord guide is a round rod fixed on the bottom plate.

Furthermore, the bottom plate defines a through hole in a positioning corresponding to the great diameter end of the reel, the first cord guide is mounted at an opening of a bottom end of the through hole; a bottom of the first cord guide is lower than a top surface of the bottom plate, the bottom plate defines a long slot between the first cord guide and the cord guiding hole; wherein a second cord guide is formed at an opening of a top end of the cord guiding hole, protruding out of the top surface of the bottom plate, the cord let out from the great diameter end of the reel extends through the through hole, is wound on the first cord guide, extends through the long slot from a bottom of the bottom plate to extend above the bottom plate, then extends about the second cord guide, and extends down through the cord guiding hole to extend below the bottom plate.

Furthermore, the second cord guide is a cord guiding sleeve embedded in the cord guiding hole and made of wear-resistant material, a top of the cord guiding sleeve forms a guiding convex arc surface that is higher than the top surface of the bottom plate and is used for adhering and extension of the cord, a bottom of the cord guiding sleeve protrudes out a predetermined length from the opening of the bottom end of the cord guiding hole.

Furthermore, the bases at a same end of the two cord winding and unwinding mechanisms are integrally formed, each base is rotatably mounted with two reels that respectively belong to the two cord winding and unwinding mechanisms and are parallel to each other.

Beneficial Effects of the Invention

By adopting the above technical solution, embodiments of the present invention have at least the following beneficial effects. The reel is designed to be a conical cylinder whose diameter gradually decreases from one end to the other end, and the base forms a first cord guide at a position corresponding to the great diameter end of the reel to limit a position of the cord being let out from the reel, when the cord is wound on the reel, each winding of the cord generates a squeezing force along the axial direction of the reel on the cord that has been wound in the previous winding, which drives the cord that has been rolled up to gradually move towards the small diameter end of the reel, so as to avoid stacking and entanglement of the cord, and ensure that the blind body is retracted or released more smoothly and does not tilt; furthermore, the reels of the two cord winding and unwinding mechanisms are arranged in parallel in the axial direction, with the great diameter ends facing opposite to each other, or are arranged in parallel in the axial direction and are misaligned, which can reduce an axis spacing between the two cord winding and unwinding mechanisms, make an overall size of the blind driving device smaller in a direction corresponding to a thickness of an upper beam, so as to be suitable for the lower thickness of the upper beam, in order to adapt to specific thickness requirements of the blind body.

DETAILED DESCRIPTION OF THE PRESENT INVENTION

The present application will be further described in detail below with reference to the accompanying drawings and embodiments. It should be understood that the following illustrative embodiments and illustrations are only used to explain the present invention and are not intended to limit the present invention, and that the embodiments of the present invention and the features of the embodiments can be combined with each other without conflict.

Figure 1:
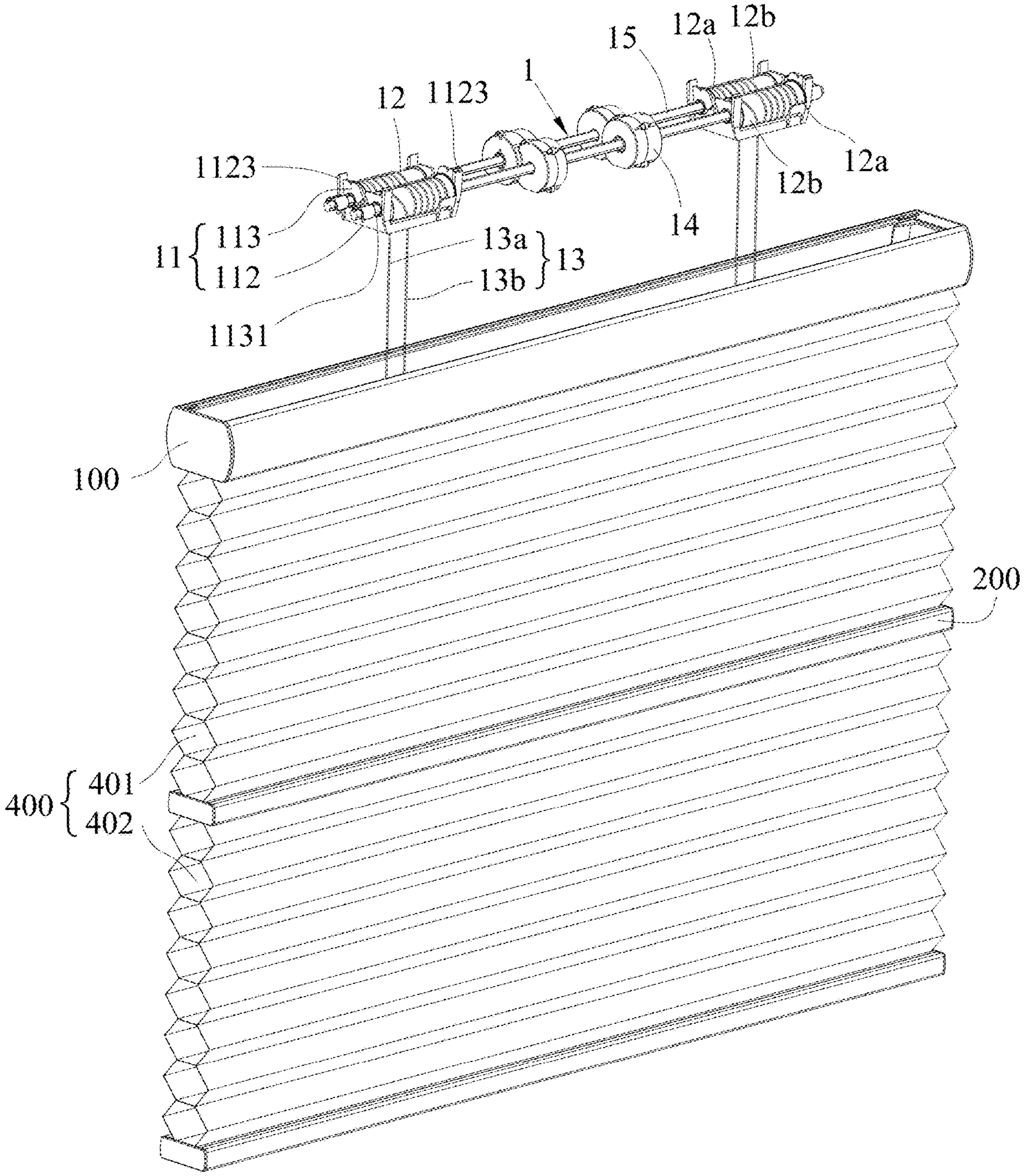
FIG. 1 is an assembled, isometric view of an embodiment of a blind driving device applied to a honeycomb blind.
Figure 2:
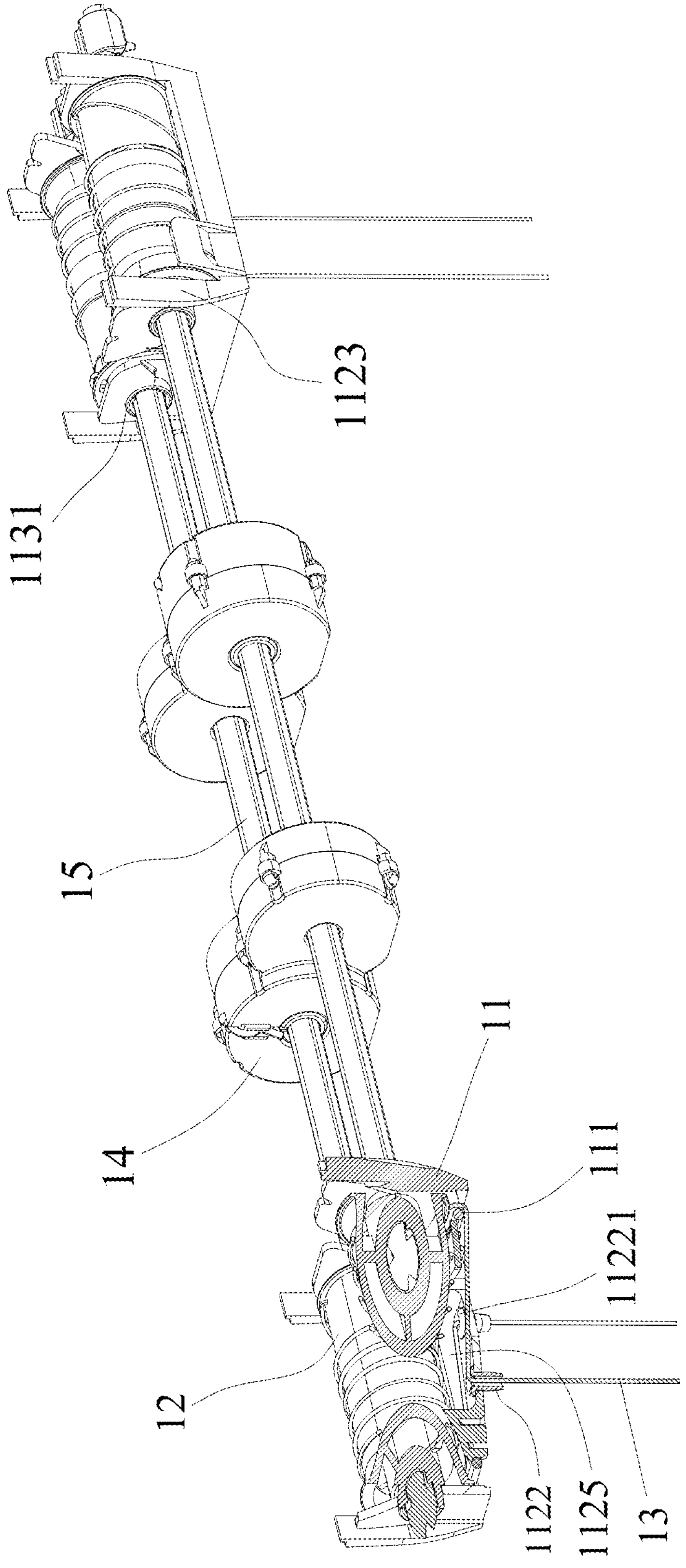
FIG. 2 is a partially cross-sectional view of a cord winding and unwinding mechanism of the blind driving device.
Figure 3:
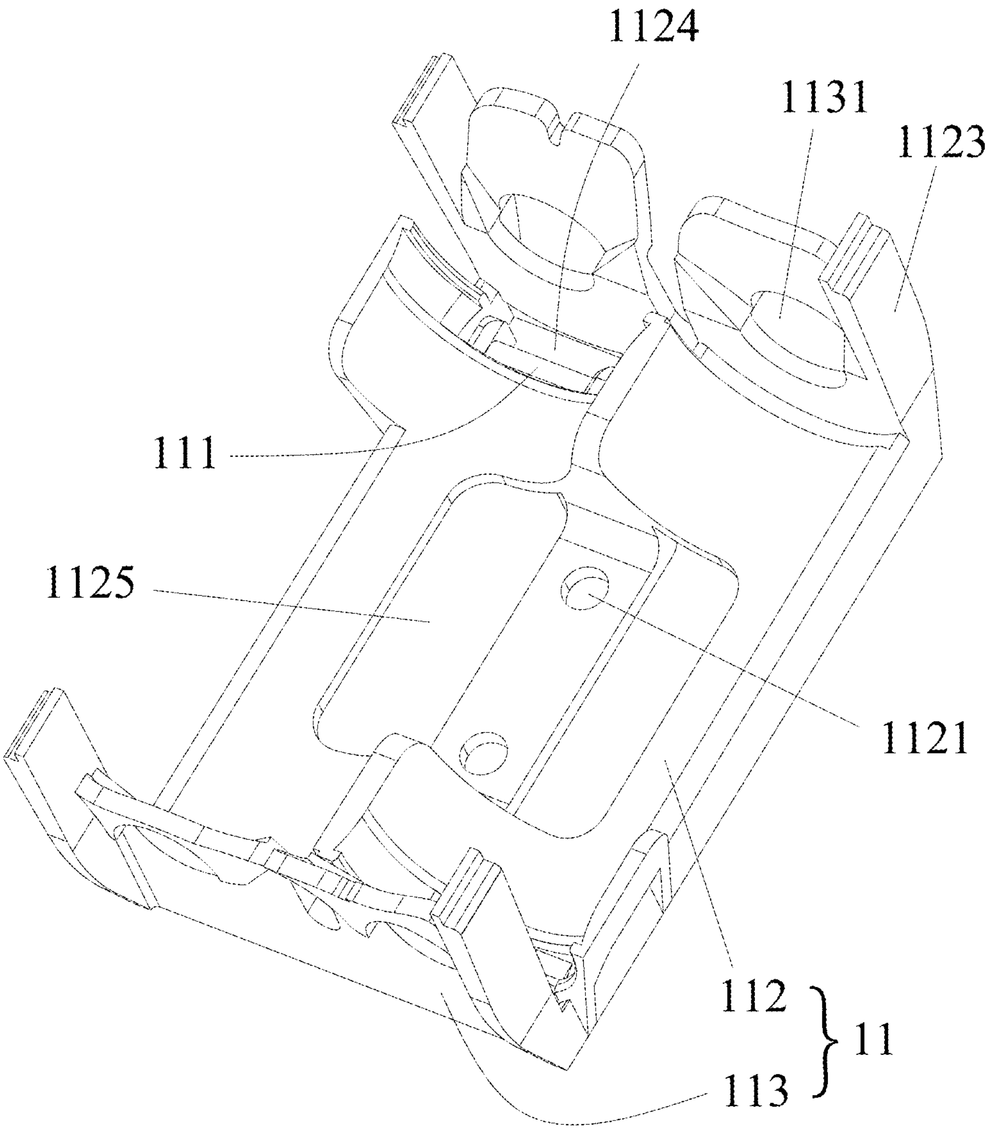
FIG. 3 is an isometric view of a base of the blind driving device.

Referring to FIGS. 1-3, an embodiment of the present invention provides a blind driving device. The blind driving device includes two cord winding and unwinding mechanisms 1 connected to different parts of a blind body 400 to drive the movement of the blind body 400. Each cord winding and unwinding mechanism 1 includes bases 11, reels 12 rotatably mounted to the corresponding bases 11, cords 13 each with one end wound on a corresponding reel 12 and the other end extending through a corresponding base 11 to be connected to the blind body 400, and a power component 14 to drive the reels 12 to rotate. The cords 13 of the two cord winding and unwinding mechanisms 1 are connected to the different parts of the blind body 400. Each reel 12 is a conical cylinder whose diameter gradually decreases from one end to the other end. Each base 11 forms a first cord guide 111 on a position corresponding to a great diameter end 12*a* of the corresponding reel 12. One end of each cord 13 is fixed to a small diameter end 12*b* of the corresponding reel 12, while the other end is led out from the large diameter end 12*a* of the reel 12 after being wound along the reel 12, and then extends down to be connected to the blind body 400 after extending about the first cord guide 111. The reels 12 of the two cord winding and unwinding mechanisms 1 are arranged in parallel in an axial direction, with the great diameter ends 12*a* facing opposite to each other, or are arranged in parallel in the axial direction and are misaligned.

In the embodiment, the reel 12 is designed as a conical cylinder with a gradually decreasing diameter from one end to the other end, and the position of the base 11 corresponding to the great diameter end 12*a* of the reel 12 forms the first cord guide 111, to limit a position where the cord 13 is let out from the reel 12. When the cord 13 is wound on the reel 12, each winding of the cord 13 generates a squeezing force along the axial direction of the reel 12 on the cord 13 that has been wound in the previous winding, which drives the cord 13 that has been rolled up to gradually move towards the small diameter end of the reel 12, so as to avoid stacking and entanglement of the cord 13, and ensure that the blind body 400 is retracted or released more smoothly and does not tilt. Furthermore, the reels 12 of the two cord winding and unwinding mechanisms 1 are arranged in parallel in the axial direction, with the great diameter ends 12*a* facing opposite to each other, or are arranged in parallel in the axial direction and are misaligned, which can reduce an axis spacing between the two cord winding and unwinding mechanisms 1, make an overall size of the blind driving device smaller in a direction corresponding to a thickness of an upper beam 100, so as to be suitable for the lower thickness of the upper beam 100, in order to adapt to specific thickness requirements of the blind body 400. In practical applications, the power component 14 can use spring motors, and one or more sets of power components 14 can be set according to a required driving force.

In specific implementation, referring to FIGS. 1-3, the reels 12 of the two cord winding and unwinding mechanisms 1 are arranged side by side, and the bases 11 of the two cord winding and unwinding mechanisms 1 are correspondingly arranged side by side. In another embodiment, referencing to FIG. 4, the reels 12 of the two cord winding and unwinding mechanisms 1 are parallel and misaligned up and down, and the bases 11 of the two cord winding and unwinding mechanisms 1 are correspondingly parallel and misaligned up and down.

In an embodiment of the present invention, as shown in FIG. 1, each cord winding and unwinding mechanism 1 includes at least two axial reels 12 set at a predetermined distance in the axial direction, and at least two bases 11 for rotatably mounting the corresponding reels 12, respectively. In the embodiment, each cording winding and unwinding mechanism 1 includes two reels 12 set at a predetermined distance and rotatably mounted to corresponding bases 11. The cords 13 respectively wound on the reels 12 of each cord winding and unwinding mechanism 1 are symmetrically connected to opposite sides of a connection end of the blind body 400, which makes forces applied on the blind body 400 more uniform during a lifting process, so as to improve the smoothness of the lifting of the blind body 400.

In an embodiment of the present invention, as shown in FIG. 1, each cord winding and unwinding mechanism 1 further includes a transmission shaft 15 connected the power component 14 and the reels 12. The transmission shaft 15 coaxially extends through centers of the reels 12 and is relatively fixed to the reels 12 in a circumferential direction. In the embodiment, by setting the transmission shaft 15 connecting the power component 14 and the reels 12, the position of the power component 14 can be reasonably designed based on the spatial layout of the upper beam 100, which can be suitable for wide width blinds.

In an embodiment of the present invention, as shown in FIGS. 1-3, the base 11 includes a bottom plate 112 and two supporting plates 113 extending from two opposite ends of the bottom plate 112. The bottom plate 112 defines a cord guiding hole 1121 in a position corresponding to a middle or the small diameter end 12*b* of the reel 12, for the cord 13 guided by the first cord guide 111 extending through. Each supporting plate 113 defines a rotation hole 1131, for a corresponding end of the reel 12 to be rotatably engaged in. In the embodiment, by setting the supporting plates 113 defining the rotation holes 1131, two ends of the reels 12 can be rotatably engaged in the rotation holes 1131 of the supporting plates 113. The bottom plate 112 defines the cord guiding hole 1121 in the position corresponding to the middle or small diameter end 12*b* of the reel 12, so as that the cord 13 let out from the great diameter end 12*a* of the reel 12 firstly is guided by the first cord guide 111, extends toward the cord guiding hole 1121, and then extends through the cord guiding hole 1121 from top to bottom to extend out of the base 11 to be connected to the blind body 400 located below the base, which makes the cord 13 undergo two turns in succession at the first cord guide 111 and the cord guiding hole 1121. Therefore, a frictional contact is generated between the cord 13 and each of the first cord guide 111 and a top hole edge of the cord guiding hole 1121, so as to obtain a certain frictional resistance, which makes the winding and unwinding of the cord 13 more stable, and can control the smooth lifting of the blind body 400.

In an embodiment of the present invention, as shown in FIGS. 1-3, a plurality of snapping arms 1123 extends up from opposite sides of the bottom plate 112, to be snapped and positioned by the upper beam 100. In the embodiment, the snapping arms 1123 are set to make the base 11 be conveniently snapped and positioned to a predetermined position of the upper beam 100, and the structure is simple and the assembly is easy.

In an embodiment of the present invention, as shown in FIGS. 1-3, the snapping arms 1123 are formed at opposite ends of each side of the bottom plate 112. Lower portions of the supporting plates 113 are integrally connected to lower portions of the corresponding snapping arms 1123, while upper portions of the supporting plates 113 are separated from upper portions of the snapping arms 1123. In the embodiment, by setting the lower portions of the supporting plates 113 to be integrally connected to the lower portions of the corresponding snapping arms 1123 and the upper portions of the supporting plates 113 to be separated from the upper portions of the snapping arms 1123, the portions that connect the supporting plate 113 and the snapping arms 1123 together has better structural strength, while the portions that separate the two has appropriate elasticity, so as that suitable elastic deformation can be generated during the assembly process, in order to assemble the reel 13 to the supporting plate 113 and secure the base 11 in the upper beam 100.

In an embodiment of the present invention, as shown in FIGS. 1-3, the bottom plate 112 defines a through hole 1124 in a position corresponding to the great diameter end 12*a* of the reel 12. The first cord guide 111 is mounted at an opening of a bottom end of the through hole 1124. A bottom of the first cord guide 111 is lower than a top surface of the bottom plate 112. The bottom plate 112 defines a long slot 1125 between the first cord guide 111 and the cord guiding hole 1121. A second cord guide 1122 is formed at an opening of a top end of the cord guiding hole 1121, protruding out of the top surface of the bottom plate 112. The cord 13 let out from the great diameter end 12*a* of the reel 12 extends through the through hole 1124, extends about the first cord guide 111, extends through the long slot 1125 from a bottom of the bottom plate 112 to extend above the bottom plate 112, then extends about the second cord guide 1122, and extends down through the cord guiding hole 1121 to extend below the bottom plate 112. In the embodiment, by setting the second cord guide 1122 to be protruded out of the top surface of the bottom plate 112, it can effectively lift the cord 13 to avoid interference between the cord 13 and the bottom plate 112 in the path of the cord 13 slantingly extending from the first cord guide 111 to the second cord guide 1122. Simultaneously, the bottom of the first cord guide 111 is lower than the top surface of the bottom plate 112, and the second cord guide 1122 is protruded out of the top surface of the bottom plate 112, so as that bending and turning angles of the cord 13 at both the first and second cord guides 111 and 1122 are greater than 90 degrees, and contact lengths of the cord 13 with the first and second cord guides 111 and 1122 are longer, which can generate greater frictional resistance, and is beneficial for controlling a speed of winding and unwinding of the cord 13, that is, a lifting speed of the blind body 400. Furthermore, it is possible to effectively utilize the thickness of the bottom plate 112 to achieve a height difference between a bottom edge of the first cord guide 111 and a top edge of the second cord guide 1122, thereby reducing a size of the entire blind driving device in height.

In an embodiment of the present invention, as shown in FIGS. 1-3, the first cord guide 111 is a round rod fixed on the bottom plate 112. The cord 13 let out from the great diameter end 12*a* of the reel 12 is wound on the round rod, and then is turned to extend through the cord guiding hole 1121. In the embodiment, the first cord guide 111 adopts the round rod, so as that a smooth outer surface of the round rod is conductive to guiding the cord 13 to adhere, bend, and extend, which reduces the wear of the cord 13.

In an embodiment of the present invention, as shown in FIGS. 1 and 3, the second cord guide 1122 is a cord guiding sleeve embedded in the cord guiding hole 1121 and made of wear-resistant material. A top of the cord guiding sleeve forms a guiding convex arc surface 11221 that is higher than the top surface of the bottom plate 112 and is used for adhering and extension of the cord 13. A bottom of the cord guiding sleeve protrudes out a predetermined length from the opening of the bottom end of the cord guiding hole 1121. In the embodiment, the top of the cord guiding sleeve forms the guiding convex arc surface 11221, which can effectively guide the cord 13 to bend and turn, thereby reducing the wear of the cord 13. The bottom of the cord guiding sleeve protrudes out the predetermined length from the opening of the bottom end of the cord guiding hole 1121, which can better position the cord 13, thereby avoiding damaging the bottom plate 112 due to friction between the cord 13 and the bottom plate 112 when the cord 13 swings with the blind body 400.

In an embodiment of the present invention, as shown in FIGS. 1-3, the bases 11 at a same end of the two cord winding and unwinding mechanisms 1 are integrally formed. Each base 11 is rotatably mounted with two reels 12 that respectively belong to the two cord winding and unwinding mechanisms 1 and are parallel to each other. In the embodiment, the bases 11 at the same end of the two cord winding and unwinding mechanisms 1 are integrally formed, and each base 11 is rotatably mounted with two reels 12 that respectively belong to the two cord winding and unwinding mechanisms 1 and are parallel to each other, so as to reduce the number of components to facilitate manufacturing and assembly.

Figure 4:
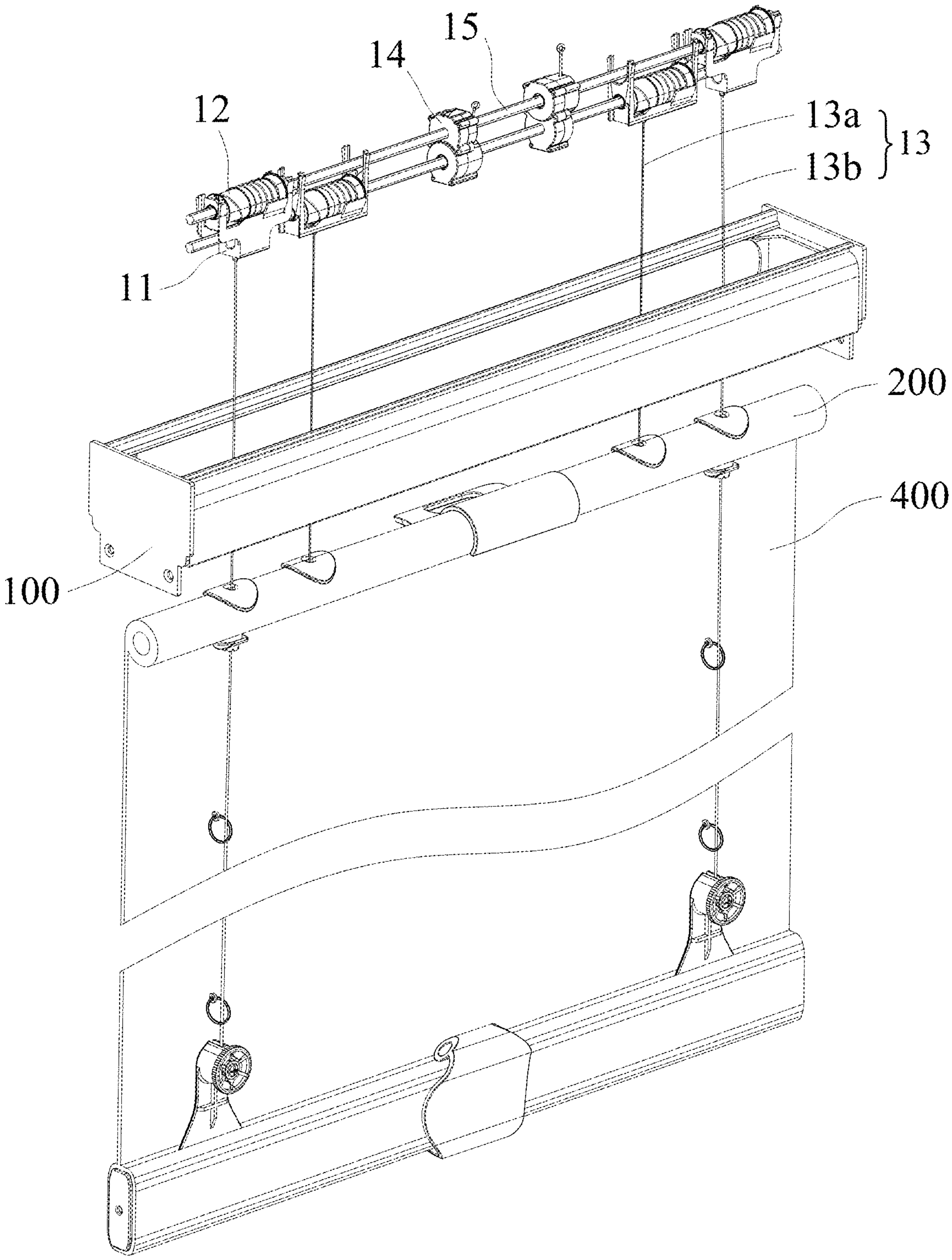
FIG. 4 is an assembled, isometric view of another embodiment of a blind driving device applied to a Roman blind.

The blind driving device of the present invention can not only be applied to segmented blinds as shown in FIG. 1 in which the cords 13*a* and 13*b* of the two cord winding and unwinding mechanisms 1 respectively drive an upper blind body 401 and a lower blind body 402 separated by a middle beam 200 to lift and lower, achieving different shading effects of the upper and lower blind bodies 401 and 402 on a window, but also can be applied to a Roman blind as shown in FIG. 4 in which the cords 13*a* and 13*b* of the two cord winding and unwinding mechanisms 1 respectively connect and drive a top side and a bottom side of the blind body 400 to lift and lower, achieving different shading effects of the blind body 400 on a window.

The embodiments of the present invention have been described above with reference to the accompanying drawings, but the present invention is not limited to the specific implementations described above, and the specific implementations described above are only schematic and not limiting. Under the enlightenment of this invention, many forms can be made without departing from the scope of this invention and the scope of protection of the claims, and these are all included in the scope of protection of this invention.

What is claimed is:

1. A blind driving device, comprising:

two cord winding and unwinding mechanisms connected to different parts of a blind body of a blind to drive activity of the blind body, wherein each cord winding and unwinding mechanism comprises a plurality of bases, a plurality of reels respectively rotatably mounted to the plurality of bases, a plurality of cords each with one end being wound on a corresponding reel and another end extending through a corresponding base and extending down to connect the blind body, and a power component for driving the plurality of reels to rotate; the plurality of cords of the two cord winding and unwinding mechanisms are connected to the different parts of the blind body;

wherein each reel is a conical cylinder whose diameter gradually decreases from a first end to a second end of said each reel, each base forms a first cord guide on a position corresponding to the first end of a corresponding reel; the one end of a corresponding cord is fixed to the second end of the corresponding reel, while the other end of the corresponding cord is led out from the first end of the corresponding reel after being wound along the corresponding reel, and then extends down to be connected to the blind body after extending about the first cord guide; wherein the plurality of reels of the two cord winding and unwinding mechanisms are arranged in parallel in an axial direction, with the first ends facing opposite to each other, or are arranged in parallel in the axial direction and are misaligned;

wherein each base comprises a bottom plate and two supporting plates extending from two opposite ends of each bottom plate, the bottom plate defines a cord guiding hole in a position corresponding to a middle or the second end of a corresponding reel, each supporting plate defines a rotation hole, for a corresponding end of the reel to be rotatably engaged in; and wherein the bottom plate defines a through hole in a position corresponding to the first end of the reel, the first cord guide is mounted at an opening of a bottom end of the through hole; a bottom of the first cord guide is lower than a top surface of the bottom plate, the bottom plate defines an elongated slot between the first cord guide and the cord guiding hole; wherein a second cord guide is formed at an opening of a top end of the cord guiding hole, protruding out of the top surface of the bottom plate, the cord let out from the first end of the reel extends through the through hole, is wound on the first cord guide, extends through the elongated slot from a bottom of the bottom plate to extend above the bottom plate, then extends about the second cord guide, and extends down through the cord guiding hole to extend below the bottom plate.

2. The blind driving device of claim 1, wherein the plurality of reels of each cord winding and unwinding mechanism comprises at least two axial reels set at a predetermined distance in the axial direction, and the plurality of bases of each cord winding and unwinding mechanism comprises at least two bases for rotatably mounting the at least two reels, respectively.

3. The blind driving device of claim 2, wherein each cord winding and unwinding mechanism further comprises a transmission shaft connecting the power component and the corresponding reels, each transmission shaft coaxially extends through centers of the corresponding reels and is relatively fixed to the reels in a circumferential direction.

4. The blind driving device of claim 1, wherein a plurality of snapping arms extends up from opposite sides of the each bottom plate, to be snapped and positioned by an upper beam of the blind.

5. The blind driving device of claim 4, wherein the plurality of snapping arms is formed at opposite ends of each side of each bottom plate, lower portions of the supporting plates are integrally connected to lower portions of corresponding snapping arms, while upper portions of the supporting plates are separated from upper portions of the corresponding snapping arms.

6. The blind driving device of claim 1, wherein each first cord guide is a round rod fixed on the bottom plate.

7. The blind driving device of claim 1, wherein each second cord guide is a cord guiding sleeve embedded in the cord guiding hole and made of wear-resistant material, a top of the cord guiding sleeve forms a guiding convex arc surface that is higher than the top surface of the bottom plate and is used for adhering and extension of the cord, a bottom of the cord guiding sleeve protrudes out a predetermined length from the opening of the bottom end of the cord guiding hole.

8. The blind driving device of claim 1, wherein the bases at a same end of the two cord winding and unwinding mechanisms are integrally formed, each base is rotatably mounted with the corresponding two reels that respectively belong to the two cord winding and unwinding mechanisms and are parallel to each other.

9. The blind driving device of claim 2, wherein the bases at a same end of the two cord winding and unwinding mechanisms are integrally formed, each base is rotatably mounted with the corresponding two reels that respectively belong to the two cord winding and unwinding mechanisms and are parallel to each other.

10. The blind driving device of claim 3, wherein the bases at a same end of the two cord winding and unwinding mechanisms are integrally formed, each base is rotatably mounted with the corresponding two reels that respectively belong to the two cord winding and unwinding mechanisms and are parallel to each other.

11. The blind driving device of claim 4, wherein the bases at a same end of the two cord winding and unwinding mechanisms are integrally formed, each base is rotatably mounted with the corresponding two reels that respectively belong to the two cord winding and unwinding mechanisms and are parallel to each other.

12. The blind driving device of claim 5, wherein the bases at a same end of the two cord winding and unwinding mechanisms are integrally formed, each base is rotatably mounted with the corresponding two reels that respectively belong to the two cord winding and unwinding mechanisms and are parallel to each other.

13. The blind driving device of claim 6, wherein the bases at a same end of the two cord winding and unwinding mechanisms are integrally formed, each base is rotatably mounted with the corresponding two reels that respectively belong to the two cord winding and unwinding mechanisms and are parallel to each other.

14. The blind driving device of claim 7, wherein the bases at a same end of the two cord winding and unwinding mechanisms are integrally formed, each base is rotatably mounted with the corresponding two reels that respectively belong to the two cord winding and unwinding mechanisms and are parallel to each other.

* * * * *